T. J. Sloan,
Screw-Blank Feeder.
N° 8,397.   Patented Sep. 30, 1851.

UNITED STATES PATENT OFFICE.

THOMAS J. SLOAN, OF NEW YORK, N. Y.

MACHINE FOR ARRANGING SCREW-BLANKS AND ARTICLES OF A SIMILAR CHARACTER.

Specification of Letters Patent No. 8,397, dated September 30, 1851.

*To all whom it may concern:*

Be it known that I, THOMAS J. SLOAN, of the city, county, and State of New York, have invented certain new and useful Improvements in the Machine for Arranging and Feeding or Delivering Wood-Screens, Screw-Blanks, and other Articles, and that the following is a full, clear, and exact description thereof, reference being had to the accompanying drawings, making part of this specification, in which—

Figure 1:
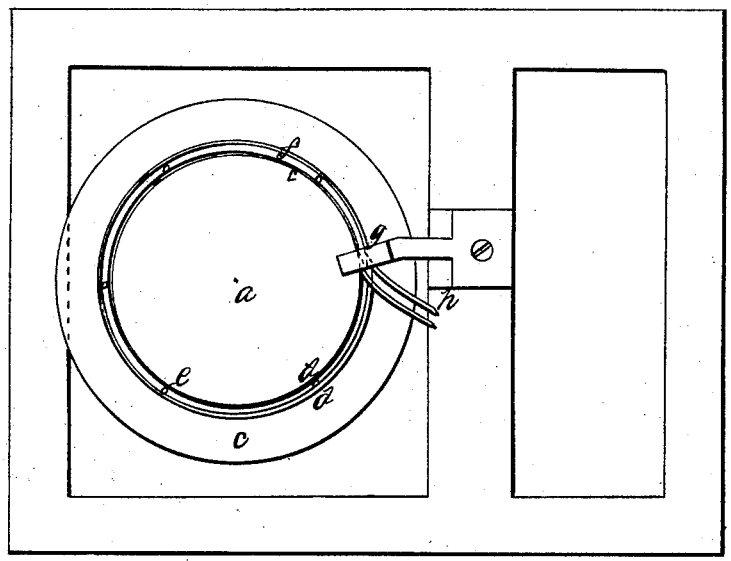
Figure 2:
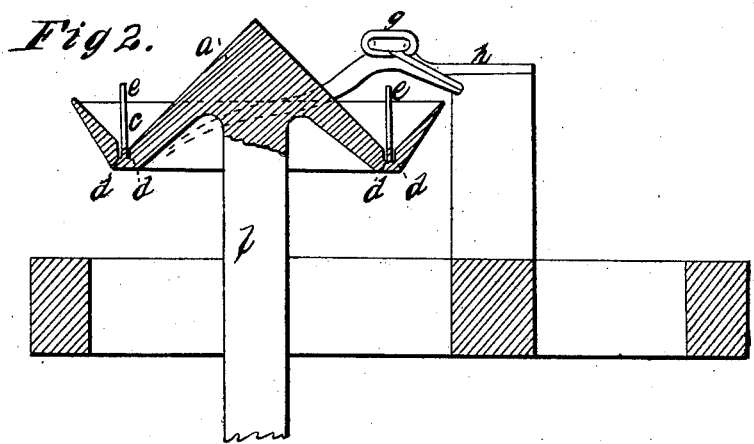

Figure 1, is a plan, and Fig. 2, a vertical section.

The same letters indicate like parts in the two figures.

The nature of my invention consists in combining two inclined stationary ways with a movable trough formed of oppositely inclined surfaces, provided with a pin or pins or their equivalents, that pass between the ways, the lower end of the said ways extending down to, or below the surface of the said trough; so that as the said trough, with its pin or pins, is set in motion toward the ways, the screws or other articles to be arranged and delivered will be carried on to the ways, and such of them as are found with their shanks between the ways, will be carried or forced up the inclined ways to the delivery end.

In the accompanying drawings *a* represents a plate on a vertical shaft *b* mounted in an appropriate frame and provided with a pulley or some other means of communicating a rotary motion from some first mover.

In the upper surface of the plate is formed a concentric trough *c* of two oppositely inclined and concentric surfaces. And on each side of the bottom angle of this trough, where the two inclined surfaces meet, there is a concentric groove *d*, the distance between the two said grooves being about equal to the diameter of the shanks of the screws or other articles to be arranged. And at given distances apart and between the two grooves *d*, *d*, are placed vertical pins *e*.

Two ways *f*, *f*, parallel with the grooves *d*, *d*, and in length about one third of a circle, are connected together and inclined downward, so as to have their lower ends in the grooves, and their upper ends at *g* so elevated that the pins *e* in their revolutions will pass between the ways for a portion of their length and then below them. From the point *g* the ways run out from the circle, and incline downward in the reverse direction. The space between the ways should be equal to the space between the grooves *d*, *d*, so that the heads of the screws or other articles will hang on the ways, with the shanks between them. The outer end *h*, of the ways should be connected either with the feeding hands or other apparatus which is to present the blanks, screws, etc., to machinery in which they are to be worked, or with any article in which, or by which they are to be received.

Screws or other articles to be arranged are thrown into the trough, and by gravity will descend along the inclined sides to the bottom, and as the trough with its pins, rotates, the screws &c. will be carried on to the inclined ways, the shanks entering between them, the pins will force them up to the summit at *g*, where the inclination of the ways is reversed so that they will then by gravity descend to the delivery end where they are discharged in any manner desired.

Having thus described the principle or mode of operation of my said invention and the manner of constructing and using the same, I wish it to be distinctly understood that I do not limit myself to the precise mode of construction and arrangement specified, as these may be varied without changing the character of my invention.

What I claim as new and desire to secure by Letters Patent is—

The combination of the inclined ways, substantially such as herein described, with a trough, substantially such as described, and provided with a pin or pins or their equivalent, as described, so that by the motion of the trough toward the ways, or vice versa, the screws or other articles will be forced up the inclined ways, hanging by their heads, as described.

THOS. J. SLOAN.

Witnesses:
DANIEL BOWLY,
HENRY ISAACS.